T. E. MARABLE.
Cotton-Choppers.

No. 149,492. Patented April 7, 1874.

Witnesses.

Inventor
T. E. Marable
by his Attys

UNITED STATES PATENT OFFICE.

THOMAS E. MARABLE, OF PETERSBURG, VA., ASSIGNOR OF TWO-THIRDS HIS RIGHT TO JOSEPH B. DUNN AND STARKE A. PLUMMER, OF SAME PLACE.

IMPROVEMENT IN COTTON-CHOPPERS.

Specification forming part of Letters Patent No. 149,492, dated April 7, 1874; application filed February 6, 1874.

*To all whom it may concern:*

Be it known that I, THOMAS E. MARABLE, of Petersburg, in the county of Dinwiddie and State of Virginia, have invented a new and Improved Cotton-Chopper; and I do hereby declare the following to be a full and exact description of the same, reference being had to the accompanying drawings forming part of this specification.

Figure 1:
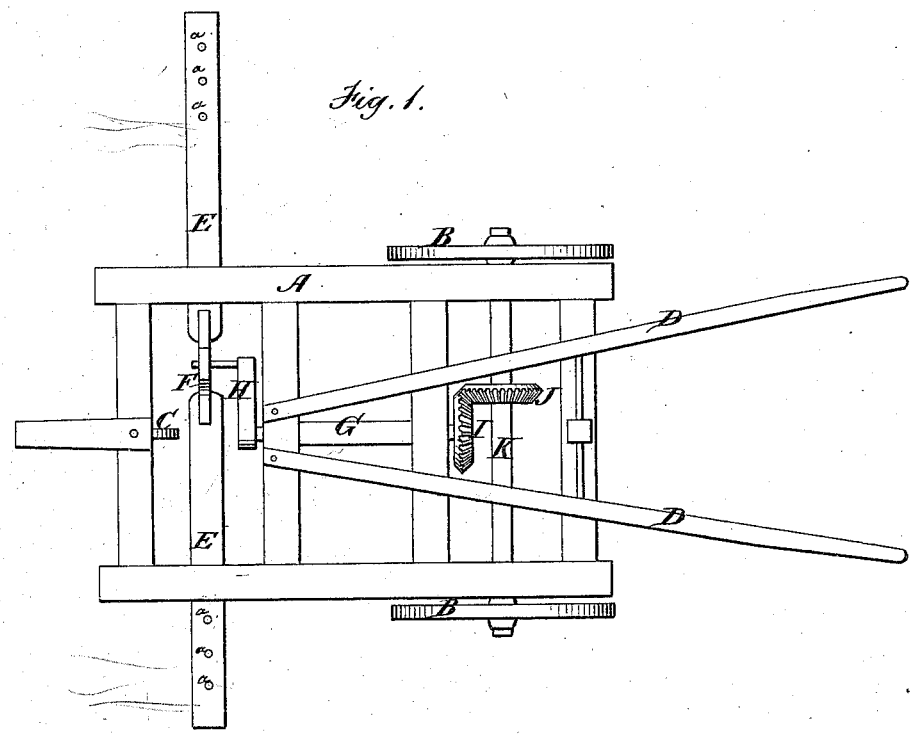
Figure 2:
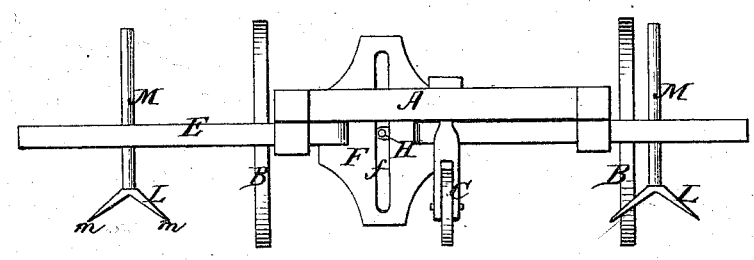
Figure 3:
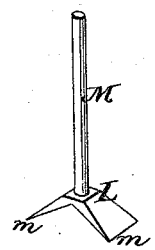

Figure 1 is a top-plan view of my invention; Fig. 2, a front elevation, and Fig. 3 a perspective view of one of the knives.

Similar letters of reference in the accompanying drawings denote the same parts.

This invention has for its object to provide a chopper for thinning out cotton-plants, which shall operate alternately upon two rows of plants at each passage across the field; and to this end it consists, mainly, of a sliding horizontal bar, provided at each end with a depressed knife capable of lateral adjustment on said bar for rows of different widths, and mounted transversely on a frame, in such manner as to receive a horizontally-reciprocating motion from the driving-shaft, such motion thrusting the knives alternately into each row that the machine travels between, each thrust cutting a section of plants from the row.

A represents a suitable frame, mounted on driving-wheels B B at the rear, and a suitable caster-wheel, C, at the front, and provided with handles D. E represents a transverse horizontal bar located on the front end of the frame A, and sliding in suitable guides thereon. At the center of the bar E is an enlargement, F, in which is a vertical slot, *f*. G is a longitudinal shaft, having its bearings in cross-pieces of the frame A. Said shaft is provided at its front end with a crank, H, which engages with the slot *f* of the bar E, and at its opposite end with a bevel-pinion, I, which meshes into a similar pinion, J, on the driving-shaft K. L L are choppers or knives attached to standards M, which pass through the ends of the bar E, the knives projecting below the bar sufficiently far to cut the roots of the plants.

It will be seen that, as the machine is drawn between two rows of cotton-plants, a reciprocating motion is given to the bar E by means of the shaft G and its crank H, this motion thrusting the knives M alternately into each row of plants.

The knives are of an inverted-V shape, having two cutting-edges, *m*, arranged at right angles to the line of motion of the bar E; consequently each thrust of the latter cuts a section from one of the rows; and, as the machine advances, a cut is made first on one side and then upon the other, thus thinning two rows at each trip. *a a* (see Fig. 1) are perforations in the bar E for the insertion of the shanks or standards M of the cutters L. It is obvious from this construction that the cutters can thus be adjusted laterally along the reciprocating bar E for rows of different widths. The distance of the knives from the center of the bar E can thus be varied to correspond with the distance between the rows, and this peculiar shape adapts them to cut in both directions of their movement.

I claim as my invention—

The reciprocating bar E, having the slotted enlargement F at its center, and provided with the perforations *a a*, for the reception of the standards M of the adjustable cutters L, in combination with the axle K, shaft G, pinions I J, and crank H, substantially as described, and for the purpose set forth.

T. E. MARABLE.

Witnesses:
I. P. DAVIS,
A. JOHNSON.